United States Patent [19]

Brennan

[11] 4,439,549
[45] Mar. 27, 1984

[54] NOVEL AROMATIC POLYESTER POLYOL MIXTURES MADE FROM POLYETHYLENE TEREPHTHALATE RESIDUES AND ALKYLENE OXIDES

[75] Inventor: Michael E. Brennan, Austin, Tex.

[73] Assignee: Texaco Inc., White Plains, N.Y.

[21] Appl. No.: 443,727

[22] Filed: Nov. 22, 1982

[51] Int. Cl.$^3$ .............................................. C08G 18/14
[52] U.S. Cl. ................................. 521/131; 252/182; 521/48; 521/172; 521/173; 528/297; 528/308.1; 560/93
[58] Field of Search ................. 521/172, 173, 131, 48; 528/297, 308.1; 560/93; 252/182

[56] References Cited

U.S. PATENT DOCUMENTS 3,641,112 2/1972 Ichikawa et al. ..................... 560/93
4,394,286 7/1983 Millick ................................ 521/172

Primary Examiner—Maurice J. Welsh
Attorney, Agent, or Firm—Jack H. Park; Kenneth R. Priem; David L. Mossman

[57] ABSTRACT

Mixtures of aromatic polyols containing ester functionalities suitable for use in rigid polyurethane and polyisocyanurate foams are described. The mixtures are prepared by reacting a polyethylene terephthalate (PET) residue with an alkylene oxide in the presence of a basic catalyst. These novel polyol mixtures may be blended with conventional polyols to yield rigid foams with better flammability resistance as compared with foams made from conventional polyols alone.

18 Claims, No Drawings

NOVEL AROMATIC POLYESTER POLYOL MIXTURES MADE FROM POLYETHYLENE TEREPHTHALATE RESIDUES AND ALKYLENE OXIDES

CROSS-REFERENCES TO RELATED APPLICATIONS

This application is related to U.S. patent application Ser. No. 443,822, filed Nov. 22, 1982, which concerns the production of unique polyol mixtures by the reaction of terephthalic acid residues with amino alcohols; the reaction product of which is subsequently reacted with an alkylene oxide, filed of even date.

BACKGROUND OF THE INVENTION

1. Field of the Invention

The invention relates to polyols for rigid foams and more particularly relates to aromatic polyester polyols made from polyethylene terephthalate residues which impart improved fire resistance to the rigid polyurethane foams they are employed in.

2. Description of Other Relevant Compounds in the Field

It is known to prepare foam from polyurethanes by the reaction of a polysiocyanate, a polyol and a blowing agent such as a halogenated hydrocarbon, water or both, in the presence of a catalyst. One particular area of polyurethane technology is based upon rigid polyurethane foams.

The art is replete with a wide variety of polyols useful as one of the main components in preparing polyurethanes such as polyurethane foams. As an example, U.S. Pat. No. 2,965,615 suggests use of co-polymers of alkenyl-substituted aromatic compounds such as styrene, and ethylenically unsaturated monohydric alcohols such as allyl alcohol as a useful resinous polyol in urethane production. Also disclosed as useful polyol sources are alkoxylated reaction products of the above co-polymers.

Further, U.S. Pat. No. 4,094,828 describes how a polyol combination comprising a co-polymer of allyl alcohol and styrene and a polyether polyol provides for rigid polyurethane foams possessing unusual dimensional stability and heat distortion properties. Amino polyols may be modified with epoxy resin and alkylene oxides according to the invention disclosed in U.S. Pat. No. 4,309,532. These modified polyols produce rigid polyurethane foams that have higher heat distortion temperatures and better low temperature properties than foams made with polyols not modified in such a fashion.

Rigid foams generally have good insulative properties and are thus desirable for use in building insulation. As with all building materials, it is desirable to provide rigid foams that are as fire resistant as possible. One approach to this goal is to modify the polyol.

Polyisocyanurate foams are a type which are considered to be fire resistant and show low smoke evolution on burning. However, polyisocyanurate foams tend to be brittle or friable. Various types of polyols have been devised to lower the foam friability, but what frequently happens is that the fire and smoke properties of the polyisocyanurate foam deteriorate. Thus, a fine balance exists between the amount and type of polyol one adds to a polyisocyanurate foam formulation in order to maintain maximum flame and smoke resistance while at the same time reach an improvement in foam friability. U.S. Pat. Nos. 4,039,487 and 4,092,276 describe attempts at this fine balance, although each has its disadvantages.

Scrap polyalkylene terephthalate, such as polyethylene terephthalate (PET), is known to be incorporated into polyurethanes. For example, U.S. Pat. No. 4,048,104 relates that polyisocyanate prepolymers for use in polyurethane products may be prepared by combining an organic polyisocyanate with polyols which are the hydroxyl-terminated digestion products of waste polyalkylene terephthalate polymers and organic polyols. A polyol ingredient which is the digestion product of polyalkylene terephthalate residues or scraps digested with organic polyols is also described in U.S. Pat. No. 4,223,068. Another case where terephthalic acid residues are employed is outlined in U.S. Pat. No. 4,246,365 where polyurethanes are made from polyesters containing at least two hydroxyl groups and terephthalic acid residues.

More relevant to the compounds of this invention is the solution proposed in U.S. Pat. No. 4,237,238. In this patent, a polyol mixture is prepared by the transesterification of a residue from the manufacture of dimethyl terephthalate with a glycol, which is then used to produce polyisocyanurate foams having a combination of a high degree of fire resistance with low smoke evolution, low foam friability and high compressive strength. The preparation of such a polyol mixture (from ethylene glycol and dimethyl terephthalate esterified oxidate residue) is described in U.S. Pat. No. 3,647,759. J. M. Hughes and John Clinton, in the Proceedings of the S.P.I. 25th Annual Urethane Division Technical Conference, Scottsdale, Ariz. (October 1979), describe other foams prepared from the polyols of U.S. Pat. No. 3,647,759.

Another type of polyisocyanurate foam employs a polyol blend using both amide diols and primary hydroxyl polyols to give a foam having a high reaction exotherm, making it particularly suited to the preparation of polyisocyanurate foam laminates, according to U.S. Pat. No. 4,246,364.

There is still a need for a rigid polyurethane foam that has a high flame resistance. Part of the problem with the polyols of U.S. Pat. No. 3,647,759 is that they are not very compatible with trichlorofluoromethane, the gas entrapped in closed-cell rigid foams, which accounts for the excellent insulating properties of these foams.

SUMMARY OF THE INVENTION

The invention concerns a mixture of aromatic polyols having ester and hydroxyl functionalities for use in preparing rigid foams, being produced by the process comprising reacting a polyethylene terephthalate residue containing ester functionalities with an alkylene oxide in the presence of a basic catalyst to give an aromatic polyester polyol.

DETAILED DESCRIPTION OF THE PREFERRED EMBODIMENTS

In general, it has been discovered that rigid polyurethane foams having improved resistance to fire may be made using a mixture of aromatic amino polyols and the aromatic polyols of this invention. In addition, such as polyol mixture is compatible with the trichlorofluoromethane blowing agent. The novel aromatic ester polyols are made by using a PET residue. This may be any waste or scrap residue from the manufacture of polyethylene terephthalate. These residues may also contain hydroxyl functionalities. One such PET residue stream is described in the examples. What is important is that a cheap source of the terephthalic acid moiety is provided.

The second class of reactants in the synthesis of the compounds of this invention encompasses alkylene oxides. Virtually any alkylene oxide would work. These compounds have the structure

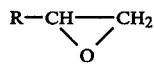

where R is an alkyl group, preferably of 1 to 4 carbon atoms. The simpler alkylene oxides, such as ethylene oxide, propylene oxide, butylene oxide, etc. are preferred, with propylene oxide being especially preferred. Mixtures of oxides would also be useful.

The proportion of alkylene oxide to be added should be enough to give the desired OH (hydroxyl) numbers. Also, the saponification number of the PET residue is taken into account as a measure of equivalents in figuring the alkylene oxide proportion. The equivalents of alkylene oxide are matched with the equivalents of esterification sites in the PET residue. Mixtures of oxides such as a mixture of ethylene and propylene oxides are particularly preferred.

The reaction is catalyzed by a basic material. Preferably, bases such as alkali or alkaline earth metal hydroxides or tertiary amines are employed. Especially preferred as catalysts are sodium hydroxide, potassium hydroxide and tertiary amino alkyl phenols, such as 2,4,6-tris(N,N-dimethylaminomethyl)phenol, also known as DMP. The catalyst may be present in an amount from 0.1 to 10 weight percent based on the residue, preferably from 0.5 to 3.5 weight percent.

The temperature of the reaction should be about 100° to 200° C. Preferably, the temperature runs from about 120° to 160° C. The pressure should generally range from 1 to 40 atmospheres, preferably from 1 to 10 atmospheres. The polyol should have a hydroxyl number in the range of 100 to 300, with an especially preferred hydroxyl number range of 140 to 240.

When these polyols are blended with conventional polyols, foams with better fire resistance are produced as compared with foams made only with the conventional polyols. The polyols of this invention can also be used to prepare isocyanurate foams which have good fire resistance.

There is better compatibility of the polyols of this invention with trichlorofluoromethane as compared with the polyols of the type presented in U.S. Pat. No. 3,657,759. Trichlorofluoromethane, sold under the tradename FREON ® R11B, a conventional blowing agent, is the gas entrapped in closed-cell rigid foams which accounts for the excellent insulating properties of these foams.

The polyol mixtures of this invention may be used as the sole polyol component in a polyurethane foam formulation or, preferably, as part of a blend of polyols. These polyols may also be used in polyisocyanurate foams. Generally, the polyol mixtures of this invention are useful as polyol extenders and can replace to some extent more expensive polyols.

The second constituent of the overall polyol combination found particularly useful in preparing rigid polyurethane foams is a polyether polyol having a hydroxyl number of 200–800. Usually the polyether polyol comprises 0–95 percent by weight of the total polyol combination weight. Preferred polyether polyols of this type are the reaction products of a polyfunctional active hydrogen initiator and propylene oxide, ethylene oxide or mixed propylene oxide and ethylene oxide. The polyfunctional active hydrogen initiator most preferably has a functionality of 2–8.

A wide variety of initiators may be alkoxylated to form useful polyether polyols. Thus, for example, polyfunctional amines and alcohols of the following type may be alkoxylated: monoethanolamine, diethanolamine, triethanolamine, ethylene glycol, polyethylene glycol, propylene glycol, polypropylene glycol, glycerine, sorbitol, trimethylolpropane, sucrose and other carbohydrates.

Such above amines or alcohols may be reacted with an alkylene oxide such as ethylene oxide, propylene oxide, or mixed ethylene oxide and propylene oxide using techniques known to those skilled in the art. Thus, for example, the reaction of alkylene oxide with initiators of this type is set forth in U.S. Pat. Nos. 2,948,757 and 3,000,963. Essentially such alkoxylations are carried out in the presence of a basic catalyst at a temperature sufficient to sustain the reaction. The hydroxyl number which is desired for the finished polyol would determine the amount of alkylene oxide used to react with the initiator. As noted above, the polyether polyols useful here have a hydroxyl number ranging from about 200 to about 800. The reaction mixture is then neutralized and water and excess reactants and stripped from the polyol. The polyether polyol may be prepared by reacting the initiator with propylene oxide or ethylene oxide, or by reacting the initiator first with propylene oxide followed by ethylene oxide or vice versa in one or more sequences to give a so-called block polymer chain or by reacting the initiator at once with propylene oxide and ethylene oxide mixture to achieve a random distribution of such alkylene oxides.

Especially preferred as the second polyol constituent are the nitrogen-containing polyether polyols described in U.S. Pat. Nos. 3,297,597 and 4,137,265, incorporated by reference herein. These particularly preferred polyols are marketed by Texaco Chemical Company as THANOL ® R-350-X and THANOL R-650-X polyols. These polyols are prepared by reacting from 2 to 3 moles of propylene oxide with one more of the Mannich reaction product of a mole of phenol or nonylphenol with one or two moles of diethanolamine.

The final polyol combination more preferably comprises 0–95 percent by weight of said polyether polyol and 100–5 percent by weight of aromatic polyester polyol. Although the aromatic polyols of this invention may be used alone, it is preferred that they be present in an amount of from 30 to 70 weight percent of the polyol blend. The polyol combination in many instances has a total hydroxyl number ranging from about 200 to about 600. A preferred range is a hydroxyl number of from 300 to 500.

Any aromatic polyisocyanate may be used in the practice of the instant invention. Typical aromatic polyisocyanates include m-phenylene diisocyanate, p-phenylene diisocyanate, polymethylene polyphenylisocyanate, 2,4-toluene diisocyanate, 2,6-tolylene diisocyanate, dianisidine diisocyanate, bitolylene diisocyanate, naphthalene-1,4-diisocyanate, diphenylene-4,4'-diisocyanate, aliphatic-aromatic diisocyanates, such as xylylene-1,4-diisocyanate, xylylene-1,2-diisocyanate, xylylene-1,3-diisocyanate, bis(4-isocyanatophenyl)methane, bis(3-methyl-4-isocyanatophenyl)methane, and 4,4'-diphenylpropane diisocyanate.

Greatly preferred aromatic polyisocyanates used in the practice of the invention are methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing the methylene-bridged polyphenyl polyamines and corresponding methylene-bridged polyphenyl polyisocyantes therefrom are described in the literature and in many patents; for example, U.S. Pat. Nos. 2,683,730; 2,950,263; 3,012,008; 3,344,162; and 3,362,979.

Most preferred methylene-bridged polyphenyl polyisocyanate mixtures used here contain from about 20 to about 100 weight percent methylene diphenyl diisocyanate isomers with the remainder being polymethylene polyphenyl polyisocyanates having higher functionalities and higher molecular weights. Typical of these are polyphenyl polyisocyanate mixtures containing about 20 to 100 weight percent methylene diphenyl diisocyanate isomers, of which 20 to about 95 weight percent thereof is the 4,4'-isomer with the remainder being polymethylene polyphenyl polyisocyanates of higher molecular weight and functionality that have an average functionality of from about 2.1 to about 3.5. The isocyanate mixtures are known commercially available materials and can be prepared by the process described in U.S. Pat. No. 3,362,979, issued Jan. 9, 1968 to Floyd E. Bentley.

In the production of rigid polyurethane foams in the practice of the invention, other known additives are necessary. One such constituent is the blowing agent. Some examples of such material are trichloromonofluoromethane, dichlorodifluoromethane, dichloromonofluoromethane, 1,1-dichloro-1-fluoroethane, 1,1-difluoro-1,2,2-trichloroethane, chloropentafluoroethane, and the like. Other useful blowing agents include low-boiling hydrocarbons such as butane, pentane, hexane, cyclohexane, and the like. See U.S. Pat. No. 3,072,582, for example. The polyols of this invention are quite compatible with fluorocarbon blowing agents unlike some of the prior art polyols which are also made from dimethyl terephthalate (DMT) residues.

Surfactant agents, better known as silicone oils, are added to serve as a cell stabilizer. Some representative materials are sold under the names of SF-1109, L-520, L-521 and DC-193 which are, generally, polysiloxane polyoxyalkylene blocked co-polymers, such as those disclosed in U.S. Pat. Nos. 2,834,748; 2,917,480; and 2,846,458, for example.

Should further fire retardancy be required for the polyurethane foam, two types of fire retardants are available; those that are incorporated by mere mechanical mixing and those that become chemically bound in the polymer chain. Representative of the first type are tris(chloroethyl)phosphate, tris(2,3-dibromopropyl)phosphate, diammonium phosphate, various halogenated compounds and antimony oxide. Representative of the chemically bound type are chlorendic acid derivatives, and various phosphorous-containing polyols.

The catalysts which may be used to make the foams of this invention are well known. There are two general types of catalyst, tertiary amines and organometallic compounds. Examples of suitable tertiary amines, used either individually or in mixture, are the N-alkylmorpholines, N-alkylalkanolamines, N,N-dialkylcyclohexylamines and alkylamines where the alkyl groups are methyl, ethyl, propyl, butyl, etc. Examples of specific tertiary amine catalysts useful in this invention are triethylenediamine, tetramethylethylenediamine, triethylamine, tripropylamine, tributylamine, triamylamine, pyridine, quinoline, dimethylpiperazine, dimethylhexahydroaniline, piperazine, N-ethylmorpholine, 2-methylpiperazine, dimethylaniline, nicotine, dimethylaminoethanol, tetramethylpropanediamine and methyltriethylenediamine. Useful organometallic compounds as catalysts include those of bismuth, lead, tin, titanium, iron, antimony, uranium, cadmium, cobalt, thorium, aluminum, mercury, zinc, nickel, cerium, molybdenum, vanadium, copper, manganese, zirconium, etc. Some examples of these metal catalysts include bismuth nitrate, lead 2-ethylhexoate, lead benzoate, lead oleate, dibutyltin dilaurate, tributyltin, butyltin trichloride, stannic chloride, stannous octoate, stannous oleate, dibutyltin di(2-ethylhexoate), ferric chloride, antimony trichloride, antimony glycolate, tin glycolates, etc. Note that the polyols of this invention have considerable metal content, especially antimony. Note also that decreased cream times of foams occurs when polyols of this invention are employed. Selection of the individual catalysts and proportions to use in the polyurethane reaction are well within the knowledge of those skilled in the art, and an amine and organometallic compound are often used together in the polyurethane reaction.

The rigid polyurethane foams prepared here can be made in one step by reacting all the ingredients together at once (one-shot process) or the rigid foams can be made by the so-called "quasi-prepolymer method." In accordance with this method, a portion of the polyol component is reacted in the absence of a catalyst with the polyisocyanate component in proportion so as to provide from about 20 percent to about 40 percent of free isocyanato groups in the reaction product, based on the polyol. To prepare foam, the remaining portion of the polyol is added and the two components are allowed to react in the presence of a catalyst and other appropriate additives such as blowing agents, foam stabilizing agents, fire retardants, etc. The blowing agent, the foam stabilizing agent, the fire retardant, etc., may be added to either the prepolymer or remaining polyol, or both, prior to the mixing of the component, whereby at the end of the reaction a rigid polyurethane foam is provided.

In a preferred embodiment the amount of polyol combination is used such that the isocyanato groups are present in the foam in at least an equivalent amount, and preferably in slight excess, compared with the free hydroxyl groups. Preferably, the ingredients will be proportional so as to provide for about 1.05 to about 8.0 mole equivalents of isocyanato groups per mole equivalent of hydroxyl groups.

The invention will be illustrated further with respect to the following specific examples, which are given by way of illustration and not given as limitations on the scope of this invention. The synthesis of the polyols of this invention will be presented along with examples of how these polyols are used to prepare foams with improved qualities.

A. Preparation of Aromatic Polyester Polyols

PET Still Bottoms Waste Stream-In all examples, the PET waste stream had the following characteristics:

| | |
|---|---|
| Hydroxyl number | 236 |
| Acid number | 3 |
| Saponification number | 306 |
| Ash, % | 0.6 |
| Antimony, % | 0.75 |
| Phosphorus, ppm | 564 |
| Iron, ppm | 333 |
| Cobalt, ppm | 165 |
| Zinc, ppm | 53 |
| Calcium, ppm | 19 |
| Magnesium, ppm | 7 |
| Manganese, ppm | 6 |

The feed was a stiff putty or caulk-like solid. This is typical of PET residues.

The preparation of the aromatic polyester polyols in all examples were conducted according to the following procedure.

There was charged solid PET still bottoms waste stream and flaked potassium hydroxide (3.5%, basis PET) or 2,4,6-tris-(N,N-dimethylaminomethyl)phenol (DMP-30; 0.5-1.1%, basis PET) catalyst to a clean and dry nitrogen purged 1500 ml stirred kettle. The kettle was purged and padded with nitrogen, heated to the desired temperature and propylene oxide (PO) and/or ethylene oxide (EO) added in several intervals at 60 psig maximum. After all the alkylene oxide was added, the reaction mixture was digested for about one hour at the indicated temperature. The whole was then cooled to 90° C. and vented. In runs using KOH as catalyst, neutralization was carried out by stirring with a Britesorb 90 (synthetic magnesium silicate)/water slurry. Lights and water were stripped at 90° C./5 mm and then the product filtered hot and bottled. In runs employing DMP-30 catalyst, the neutralization and filtration steps were omitted. Products were mobile, opaque liquids.

Detailed reaction conditions and product analyses are listed below.

EXAMPLE I

| | Propylene Oxide/KOH Catalyst | | |
|---|---|---|---|
| | 1 | 2 | 3 |
| PET Bottoms, g | 400 | 480 | 560 |
| Flaked KOH, g | 14 | 16.8 | 19.6 |
| Propylene oxide, g (moles) | 400(6.9) | 320(5.5) | 240(4.1) |
| Propylene oxide, ml | 482 | 386 | 289 |
| Addition, temp., °C. | 130-135 | 130-135 | 130-134 |
| time, hours | 4 5/12 | 4 | 3 1/12 |
| Digest, temp., °C. | 131 | 134 | 131-134 |
| time, hours | 0.75 | 1 | 1¼ |
| Neutralization | | | |
| Britesorb 90, g | 104 | 125 | 146 |
| slurry water, g | 202 | 295 | 293 |
| temp., °C. | 90 | 92-90 | 90 |
| time, hours | 1¼ | 1 | 1 1/6 |
| Stripped overhead, g | 244 | 337 | 333 |
| Filtered product, g | 476 | 475 | 397 |
| Filter cake, g | 363 | 318 | 454 |
| Product Analyses | | | |
| Hydroxyl number | 144 | 192 | 198 |
| Acid number | 0.97 | 0.72 | 0.92 |
| Saponification number | 206.15 | 255.53 | 297.17 |
| Water, % | 0.12 | 0.16 | 0.12 |
| Ash, % | 0.26 | 0.35 | 0.45 |
| Viscosity, cs, 25° C. | 4,227 | 8,127 | 17,862 |
| pH, 10/1 MeOH/H$_2$O | 7.0 | 6.9 | 7.0 |
| Atomic Absorption, ppm | | | |
| Sb | 16.3 | <2 | 98.4 |
| Fe | 1.72 | 0.96 | 2.45 |
| Ca | 13.56 | 10.74 | 21.73 |
| K | 1155 | 2100 | 2700 |
| P | 154 | 6.36 | 132.4 |

EXAMPLE II

| | Propylene Oxide/DMP-30 Catalyst | | | |
|---|---|---|---|---|
| | 4 | 5 | 6 | 7 |
| PET Bottoms, g | 400 | 400 | 480 | 560 |
| DMP-30, g | 2.0 | 2.0 | 2.4 | 2.8 |
| Desired PO, g (moles) | 400(6.9) | 400(6.9) | 320(5.5) | 240(4.1) |
| , ml | 482 | 482 | 386 | 289 |
| Actual PO, g | 221.6 | 219.9 | 213.9 | 240 |
| (moles) | (3.8) | (3.8) | (3.7) | (4.1) |
| ml | 267 | 265 | 258 | 289 |
| Addition, temp., °C. | 127-151 | 130-150 | 130-150 | 130-132 |
| time, hours | 8 | 11 | 8 | 7.5 |
| Digest, temp., °C. | 151 | 150 | 150 | 130 |
| time, hours | 1.0 | 1.0 | 1¼ | 1.0 |
| Unreacted PO, g (vent) | 52 | 43 | 51 | 64 |
| Stripped overhead, g | 47 | 30 | 45 | 36 |
| Product, g (by difference) | 524 | 578 | 600 | 702 |
| Comments | Leak | Stirrer motor out | | Best run |
| Product Analyses | | | | |
| Hydroxyl number | 167 | 180 | 194 | 203 |
| Acid number | 0.27 | 0.28 | 0.50 | 0.35 |
| Saponification number | 357.21 | 351.64 | 342.13 | 340.37 |
| Water, % | 0.02 | 0.07 | 0.03 | 0.02 |
| Ash, % | 0.56 | 0.63 | 0.42 | 0.50 |
| Viscosity, cs, 210° F. | 186 | 129 | 9,076(100°) | 102 |
| pH, 10/1 MeOH/H$_2$O | 8.7 | 9.2 | 9.5 | 9.3 |
| Atomic Absorption | | | | |
| Sb, ppm | 7,200 | 7,265 | 6,992 | 7,320 |
| Fe | 253 | 177 | 164 | 195 |
| Ca | 99.8 | 75.0 | 76.0 | 35.0 |
| P | 486 | 467 | 468 | 394 |

EXAMPLE III

| Ethylene Oxide/KOH Catalyst | | | |
|---|---|---|---|
| | 8 | 9 | 10 |
| PET Bottoms, g | 400 | 480 | 560 |
| Flaked KOH, g | 14 | 16.8 | 19.6 |
| Ethylene oxide, g (moles) | 400(9.1) | 320(7.3) | 240(5.5) |
| Ethylene oxide, ml | 459 | 367 | 276 |
| Addition, temp., °C. | 130–132 | 130–133 | 129–133 |
| time, hours | 4¼ | 3 11/12 | 2 |
| Digest, temp., °C. | 132 | 133–132 | 131 |
| time, hours | 1 | 1 | 1 |
| Neutralization | | | |
| Britesorb 90, g | 104 | 125 | 146 |
| slurry water, g | 202 | 295 | 293 |
| temp., °C. | 90 | 90 | 90 |
| time, hours | 1 | 1 | 1 |
| Stripped overhead, g | 292 | 299 | 290 |
| Filtered product, g | 414 | 400 | 432 |
| Filter cake, g | 386 | 454 | 454 |
| Total | 1092 | 1153 | 1176 |
| Product Analyses | | | |
| Hydroxyl number | 164 | 172 | 198 |
| Acid number | 0.27 | 0.45 | 0.81 |
| Saponification number | 212.31 | 250.41 | 293.93 |
| Water, % | 0.12 | 0.16 | 0.12 |
| Ash, % | 0.32 | 0.39 | 0.47 |
| Viscosity, cs 25° C. | 2,691 | 4,433 | 7,760 |
| pH, 10/1 MeOH/H$_2$O | 8.3 | 8.0 | 7.4 |
| Atomic Absorption, ppm | | | |
| Sb | 14.7 | 11.2 | 15.6 |
| Fe | 1.14 | <0.5 | 2.13 |
| Ca | 13.7 | 37.7 | 8.12 |
| K, wt. % | 0.20 | 0.32 | 0.35 |
| P | 26.4 | 136.0 | 190.0 |

EXAMPLE IV

| Ethylene Oxide/DMP-30 Catalyst | | | |
|---|---|---|---|
| | 11 | 12 | 13 |
| PET Bottoms, g | 400 | 480 | 560 |
| DMP-30, g | 4.0 | 5.0 | 6.0 |
| Desired EO, g (moles) | 400(9.1) | 320(7.3) | 240(5.5) |
| Desired EO, ml | 459 | 367 | 276 |
| Actual EO, g (moles) | 400(9.1) | 320(7.3) | 240(5.5) |
| Actual EO, ml | 459 | 367 | 276 |
| Addition, temp., °C. | 130–133 130–132 | 130 | |
| time, hours | 12¾ | 8,5 | 5.0 |
| Digest, temp., °C. | 133 | 130 | 130 |
| time, hours | 1.5 | 1¾ | 1 7/12 |
| Unreacted EO, g (vent) | none | 13 | none |
| Stripped overhead, g | 23 | 21 | 20 |
| Product, g | 604 | 680 | 687 |
| Product Analyses | | | |
| Hydroxyl number | 234 | 231 | 235 |
| Acid number | 0.14 | 0.10 | 0.12 |
| Saponification number | 270.88 | 289.54 | 319.91 |
| Water, % | 0.02 | 0.017 | 0.12 |
| Ash, % | 0.33 | 0.52 | 0.44 |
| Viscosity, cs, 100° F. | 1,090 | 1,447 | 2,762 |
| pH, 10/1 MeOH/H$_2$O | 10.3 | 10.2 | 9.9 |
| Atomic Absorption | | | |
| Sb, wt. % | 0.53 | 0.51 | 0.58 |
| Fe, ppm | 130.0 | 156.0 | 167.0 |
| Ca, ppm | 56.4 | 64.2 | 64.5 |
| P, ppm | 361.0 | 386.0 | 403.0 |

EXAMPLE V

| Mixed Oxides (EO/PO, 1/9 by wt.)/KOH Catalyst | | | |
|---|---|---|---|
| | 14 | 15 | 16 |
| PET Bottoms, g | 400 | 480 | 560 |
| Flaked KOH, g | 14 | 16.8 | 19.6 |
| Ethylene oxide, g (moles) | 40(0.91) | 32(0.73) | 24(0.54) |
| Ethylene oxide, ml | 46 | 37 | 28 |
| Addition, temp., °C. | 130–131 | 130–131 | 130 |
| time, hours | 0.25 | 0.33 | 0.25 |
| Digest, temp., °C. | 131 | 131–130 | 130 |
| time, hours | 1.0 | 1.0 | 1.0 |
| Propylene oxide, g (moles) | 360(6:2) | 288(5.0) | 216(3.7) |
| Propylene oxide, ml | 434 | 347 | 260 |
| Addition, temp., °C. | 131 | 130–131 | 130 |
| Addition, time, hours | 2.75 | 1 5/6 | 2.25 |
| Digest, temp., °C. | 131 | 131 | 130 |
| Digest, time, hours | 1.33 | 1.0 | 1 5/12 |
| Neutralization | | | |
| Britesorb 90, g | 104 | 125 | 146 |
| slurry water, g | 202 | 295 | 293 |
| temp., °C. | 90 | 90 | 90 |
| time, hours | 1.0 | 1.0 | 1.0 |
| Stripped overhead, g | 252 | 327 | 340 |
| Filtered product, g | 459 | 476 | 431 |
| Filter cake, g | 340 | 386 | 408 |
| Product Analyses | | | |
| Hydroxyl number | 161 | 187 | 200 |
| Acid number | 0.89 | 0.80 | 0.79 |
| Saponification number | 203.86 | 246.06 | 287.50 |
| Water, % | 0.09 | 0.12 | 0.16 |
| Ash, % | 0.23 | 0.31 | 0.40 |
| Viscosity, cs, 25° C. | 3,913 | 6,323 | 13,874 |
| pH, 10/1 MeOH/H$_2$O | 6.9 | 7.1 | 7.2 |
| Atomic Absorption | | | |
| Sb, ppm | <5.0 | <5.0 | 51.9 |
| Fe, ppm | 4.83 | 4.82 | 2.46 |
| Ca, ppm | 5.68 | 12.28 | 18.56 |
| P, ppm | <1.0 | <1.0 | <1.0 |
| K, wt. % | 881 ppm | 0.18 | 0.21 |

EXAMPLE VI

| Mixed Oxides (EO/PO, 1/9 by wt.)/DMP-30 Catalyst | | | |
|---|---|---|---|
| | 17 | 18 | 19 |
| PET Bottoms, g | 400 | 480 | 560 |
| DMP-30, g | 4.0 | 5.0 | 6.0 |
| Desired EO, g (moles) | 40(0.91) | 32(0.73) | 24(0.54) |
| Desired EO, ml | 46 | 37 | 28 |
| Actual EO, g (moles) | 40(0.91) | 32(0.73) | 24(0.54) |
| Actual EO, ml | 46 | 37 | 28 |
| Addition, temp., °C. | 130–131 | 130 | 130–131 |
| Addition, time, hours | 0.25 | 1/12 | 1/12 |
| Digest, temp., °C. | 131 | 130 | 131–130 |
| Digest time, hours | 1.0 | 1.33 | 1.0 |
| Desired PO, g (moles) | 360(6.2) | 288(5.0) | 216(3.7) |
| Desired PO, ml | 434 | 347 | 260 |
| Actual PO, g (moles) | 257(4.4) | 189(3.3) | 216(3.7) |
| Actual PO, ml | 310 | 228 | 260 |
| Addition, temp., °C. | 130–150 | 130–150 | 130 |
| Addition, time, hours | 13 1/6 | 9.0 | 8¼ |
| Digest, temp., °C. | 150 | 150 | 130 |
| Digest, time, hours | 1¼ | 0.5 | 1.5 |
| Unreacted oxides, g (vent) | 21 | 24 | none |
| Stripped overhead, g | 41 | 38 | 52 |
| Product, g | 528 | 592 | 675 |
| Product Analyses | | | |
| Hydroxy number | 220 | 226 | 216 |
| Acid number | 0.11 | 0.064 | 0.13 |
| Saponification number | 298.78 | 297.39 | 319.38 |
| Water, % | 0.01 | 0.03 | 0.02 |
| Ash, % | 0.53 | 0.50 | 0.60 |
| Viscosity, cs, 100° F. | 3,072 | 4,331 | 5,838 |
| pH, 10/1 MeOH/H$_2$O | 10.2 | 10.0 | 9.6 |
| Atomic Absorption | | | |
| Sb, wt. % | 0.13 | 0.59 | 0.57 |
| Fe, ppm | 182.0 | 151.0 | 170.0 |
| Ca, ppm | 73.5 | 67.9 | 71.1 |

| Mixed Oxides (EO/PO, 1/9 by wt.)/DMP-30 Catalyst | | | |
|---|---|---|---|
| | 17 | 18 | 19 |
| P, ppm | 288.0 | 392.0 | 473.0 |

B. Foam Preparation

Formulation components were mixed at 2700 rpm and poured into open molds and allowed to rise. Foams were submitted for physical properties after standing at room temperature for at least three days. Formulations and physical property data for selected cases are listed below.

EXAMPLE VII

| THANOL ® R-350-X/PET Polyol (70:30) Blends (600 g Pours) | | | | | |
|---|---|---|---|---|---|
| | A | B | C | D | E |
| Formulation, pbw | | | | | |
| THANOL R-350-X[1] | 33.8 | 26.7 | 26.6 | 26.9 | 26.2 |
| Polyol, Example 2 | — | 11.4 | — | — | — |
| Polyol, Example 6 | — | — | 11.4 | — | — |
| Polyol, Example 9 | — | — | — | 11.5 | — |
| Polyol, Example 13 | — | — | — | — | 11.3 |
| ANTIBLAZE ® 80[2] | 5.0 | 5.0 | 5.0 | 5.0 | 5.0 |
| Water | 0.3 | 0.3 | 0.3 | 0.3 | 0.3 |
| FREON ® R-11B[3] | 13.0 | 13.0 | 13.0 | 13.0 | 13.0 |
| L-5420[4] | 0.5 | 0.5 | 0.5 | 0.5 | 0.5 |
| FOMREZ ® UL-32[5] | 0.01 | 0.01 | 0.01 | 0.01 | 0.01 |
| MONDUR ® MR[6] (index = 1.10) | 47.4 | 43.1 | 43.2 | 42.8 | 43.7 |
| Times (sec), mixing | 10 | 10 | 4 | 8 | 4 |
| Times (sec), cream | 26 | 15 | 6 | 12 | 9 |
| Times (sec), gel | 66 | 72 | 36 | 60 | 36 |
| Times (sec), tack free | 98 | 104 | 47 | 83 | 46 |
| Times (sec), rise | 105 | 145 | 68 | 115 | 68 |
| Initial surface friability | none | none | none | none | none |
| Foam appearance | very good | very good | very good | good | good |
| Physical Properties | | | | | |
| Density, lbs/ft$^3$ | 1.87 | 1.69 | 1.75 | 1.78 | 1.68 |
| K-factor | 0.118 | 0.116 | 0.113 | — | 0.121 |
| Compressive strength, psi | | | | | |
| with rise | 41.44 | 33.42 | 41.12 | 40.45 | 39.10 |
| cross rise | 19.26 | 12.91 | 12.33 | 12.99 | 10.95 |
| Heat distortion, °C. | 152 | 120 | 122 | 130 | 127 |
| % closed cells | 91.79 | 92.64 | 93.01 | 92.86 | 92.00 |
| Friability, wt, % loss, 10 minutes | 8.18 | 3.77 | — | 3.03 | 0.78 |
| ASTM 1692 burn, in/min (BHA) | 2.49 | 2.40 | 2.41 | 1.93 | 2.18 |
| Butler Chimney Test | | | | | |
| Flame height, inches | >11 | >11 | >11 | >11 | >11 |
| Seconds to extinguish | 19 | 14 | 12.3 | 12 | 14 |
| Wt. % retained | 59.7 | 62.1 | 70.6 | 74.6 | 69.7 |

[1]An aromatic-amino polyol, hydroxyl number 530, sold by Texaco Chemical Co., described in U.S. Pat. No. 3,297,597
[2]Tris-(2-chloropropyl)phosphate, a fire retardant sold by Mobil Chemical
[3]Trichlorofluoromethane
[4]A silicone surfactant sold by Union Carbide Corp.
[5]A tin catalyst sold by Witco Chemical Corp.
[6]A polymeric isocyanate sold by Mobay Chemical Corp.

EXAMPLE VIII

| THANOL R-650-X/PET Polyol (70:30) Blends (600 g Pours) | | | | | |
|---|---|---|---|---|---|
| | F | G | H | I | J |
| Formulation, pbw | | | | | |
| THANOL R-650-X[1] | 37.0 | 28.6 | 28.5 | 28.8 | 28.1 |
| Polyol, Example 3 | — | 12.2 | — | — | — |
| Polyol, Example 7 | — | — | 12.2 | — | — |
| Polyol, Example 9 | — | — | — | 12.4 | — |
| Polyol, Example 13 | — | — | — | — | 12.1 |
| ANTIBLAZE ® 80[2] | 5.0 | 5.0 | 5.0 | 5.0 | 5.0 |
| Water | 0.3 | 0.3 | 0.3 | 0.3 | 0.3 |
| FREON ® R-11B[3] | 13.0 | 13.0 | 13.0 | 13.0 | 13.0 |
| L-5420[4] | 0.5 | 0.5 | 0.5 | 0.5 | 0.5 |
| FOMREZ ® UL-32[5] | 0.01 | 0.01 | 0.01 | 0.01 | 0.01 |
| MONDUR ® MR[6] (index = 1.10) | 44.2 | 40.4 | 40.5 | 40.0 | 41.0 |
| Times (sec), mixing | 8 | 8 | 4 | 8 | 4 |
| Times (sec), cream | 12 | 13 | 6 | 9 | 8 |
| Times (sec), gel | 51 | 63 | 33 | 48 | 30 |
| Times (sec), tack free | 64 | 75 | 38 | 63 | 37 |
| Times (sec), rise | 109 | 119 | 72 | 102 | 62 |
| Initial surface friability | none | none | none | none | none |
| Foam appearance | very good | very good | very good | good | good |
| Physical Properties | | | | | |
| Density, lbs/ft$^3$ | 1.74 | 1.80 | 1.79 | 1.81 | 1.76 |
| K-factor | 0.118 | 0.122 | 0.116 | — | 0.115 |
| Compressive strength, psi | | | | | |
| with rise | 35.94 | 32.88 | 33.08 | 33.36 | 38.63 |
| cross rise | 14.32 | 13.46 | 12.05 | 12.79 | 10.89 |
| Heat distortion, °C. | 137 | 124 | 129 | 126 | 129 |
| % closed cells | 92.02 | 92.50 | 93.75 | 95.16 | 92.00 |
| Friability, wt. % loss, 10 minutes | 6.19 | 3.96 | 1.05 | 2.39 | 1.80 |
| ASTM 1692 burn, in/min (BHA) | 2.97 | 2.68 | 2.43 | 2.16 | 2.16 |
| Butler Chimney Test | | | | | |
| Flame height, inches | >11 | >11 | >11 | >11 | >11 |
| Seconds to extinguish | 14 | 10 | 12 | 9 | 14 |
| Wt. % retained | 63.9 | 79.6 | 74.6 | 75.0 | 75.1 |

[1]An aromatic-amino polyol, hydroxyl number about 450, sold by Texaco Chemical Co., described in U.S. Pat. No. 4,137,265

EXAMPLE IX

| Isocyanurate Foams from PET Polyols 200 g Pours (3); 600 g Pour (1) | | | | |
|---|---|---|---|---|
| | K | L | M | N |
| Formulation, pbw | | | | |
| Polyol, Example 3 | 25.6 | — | — | — |
| Polyol, Example 4 | — | 28.7 | — | — |
| Polyol, Example 9 | — | — | 28.2 | — |
| Polyol, Example 13 | — | — | — | 22.6 |
| Silicone DC-193[1] | 0.5 | 0.5 | 0.5 | 0.5 |
| FREON ® R-11B[3] | 12.0 | 12.0 | 12.0 | 12.0 |
| DABCO TMR-2[2] | 1.5 | 1.5 | 1.5 | 1.5 |
| MONDUR ® MR[6] (index = 5.0) | 60.4 | 57.3 | 57.8 | 63.4 |
| Times (sec), mixing | 4 | 3 | 3 | 3 |
| Times (sec), cream | 9 | 7 | 4 | 6 |
| Times (sec), gel | 22 | 11 | 5 | 8 |
| Times (sec), tack free | 24 | 12 | 9 | 9 |
| Times (sec), rise | 41 | 27 | 19 | 19 |
| Initial surface friability | yes | yes | yes | yes |
| Foam appearance | good | good | good | fair |
| Physical Properties | | | | |
| Density, lbs/ft$^3$ | 2.04 | 2.53 | 2.73 | 3.05 |
| Compressive strength, psi | | | | |
| with rise | 32.92 | 49.16 | 54.53 | 55.50 |
| cross rise | 16.50 | 23.82 | 24.19 | 28.63 |
| Heat distortion, °C. | >225 | 217 | 219 | >225 |
| % closed cells | 94.04 | 91.97 | 90.69 | 91.10 |
| Friability, wt. % loss, 10 minutes | 9.98 | 12.74 | 14.26 | 27.00 |
| ASTM 1692 burn, in/min (BHA) | — | — | — | 1.90 |
| Butler Chimney Test | | | | |
| Flame height, inches | — | — | — | 5.16 |
| Seconds to extinguish | — | — | — | 10.0 |
| Wt. % retained | — | — | — | 94.9 |
| Dimensional Stability | | | | |
| 200° F., Dry, 1 week, ΔV | — | — | — | +1.7 |
| 200° F., Dry, 4 weeks, ΔV | — | — | — | +1.8 |

[1]A silicone surfactant sold by Dow-Corning Corp.
[2]A product of Air Products and Chemicals, Inc.

It may be seen that the polyol mixtures of this invention make excellent polyurethane and polyisocyanurate foams. In addition, the polyol mixtures of this invention provide greater fire resistance to rigid foams as compared with other polyols. For example, compare foams from formulations B, C, D and E and G, H, I and J with foams A and F, respectively. It will be seen that the foams using the polyol mixture of this invention extinguish faster and retain more weight than do the foams (A and F) made with conventional polyols without the contribution of this invention.

Many modifications may be made in the polyols of this invention without departing from the spirit and scope of the invention, which is defined only in the appended claims. For example, it may be found that polyol mixtures made from a certain kind of combination of PET residues and alkylene oxide, or made at a certain temperature or pressure may have advantages and optimized properties.

I claim:

1. A mixture of aromatic polyols having ester functionalities for use in preparing rigid foams, being produced by the process comprising reacting a polyethylene terephthalate residue containing ester functionalities with an alkylene oxide in the presence of a basic catalyst to give an aromatic polyester polyol.

2. The mixture of aromatic polyols of claim 1 in which the alkylene oxide has the formula

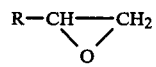

where R is hydrogen or lower alkyl of one to four carbon atoms.

3. The mixture of aromatic polyols of claim 1 in which the alkylene oxide is chosen from the group consisting of ethylene oxide, propylene oxide and mixtures thereof.

4. The mixture of aromatic polyols of claim 1 in which the reaction to make the mixture is conducted at a temperature in the range from about 100° to 200° C. and at a pressure in the range from about 1 to 40 atmospheres.

5. The mixture of aromatic polyols of claim 1 in which the reaction to make the mixture is conducted at a temperature in the range from about 120° to 160°0 C. and at a pressure in the range from about 1 to 10 atmospheres.

6. The mixture of aromatic polyols of claim 1 in which the average hydroxyl number for the mixture is between about 100 and 300.

7. The mixture of aromatic polyols of claim 1 in which the basic catalyst is taken from the group consisting of alkali metal hydroxides, alkali earth metal hydroxides and tertiary amines.

8. A method for making a mixture of aromatic polyols having ester functionalities for use in preparing rigid foams comprising reacting a polyethylene terephthalate residue containing ester and hydroxyl functionalities with an alkylene oxide in the presence of a basic catalyst.

9. The method of claim 8 in which the alkylene oxide has the formula

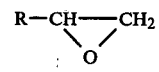

where R is hydrogen or lower alkyl of one to four carbon atoms.

10. The method of claim 8 in which the alkylene oxide is chosen from the group consisting of ethylene oxide, propylene oxide and mixtures thereof.

11. The method of claim 8 in which the reaction is conducted at a temperature in the range from about 100° to 200° C. and at a pressure in the range from about 1 to 40 atmospheres.

12. The method of claim 8 in which the reaction is conducted at a temperature in the range from about 120° to 160° C. and at a pressure in the range from about 1 to 10 atmospheres.

13. The method of claim 8 in which the average hydroxyl number of the aromatic polyol mixture is between about 100 and 300.

14. The method of claim 8 in which the catalyst employed is taken from the group consisting of alkali metal hydroxides, alkali earth metal hydroxides and tertiary amines.

15. A rigid polyurethane foam obtained by reacting in the presence of a blowing agent and a catalyst of polyurethane formation, an organic polyisocyanate and a polyol blend comprising
   a. from about 5 to 100 percent by weight of a mixture of aromatic polyols having ester functionalities which is produced by reacting a polyethylene terephthalate residue containing ester functionalities with an alkylene oxide in the presence of a basic catalyst and
   b. from about 95 to 0 percent by weight of a nitrogen-containing polyol which is the reaction product from
      (1) reacting one mole of phenol or nonylphenol with one to two moles of diethanolamine to give a Mannich reaction product, and
      (2) subsequently reacting one mole of the Mannich reaction product with two to three moles of propylene oxide.

16. The rigid polyurethane foam of claim 15 in which the blowing agent is trichlorofluoromethane.

17. A rigid isocyanurate foam which is obtained by reacting in the presence of a blowing agent and a trimerization catalyst of polyisocyanurate formation, an organic polyisocyanate and a mixture of aromatic polyols having ester functionalities which is made by reacting a polyethylene terephthalate residue with an alkylene oxide in the presence of a basic catalyst.

18. The rigid polyisocyanurate foam of claim 17 in which the blowing agent is trichlorofluoromethane.

* * * * *